United States Patent
Kuo et al.

(10) Patent No.: US 8,928,835 B2
(45) Date of Patent: Jan. 6, 2015

(54) LCD DEVICE AND ITS BACKLIGHT MODULE AND BACK PLATE ASSEMBLY

(75) Inventors: Yi-cheng Kuo, Guandong (CN);
Yu-chun Hsiao, Guandong (CN);
Chengwen Que, Guandong (CN);
Pangling Zhang, Guandong (CN);
Dehua Li, Guandong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 244 days.

(21) Appl. No.: 13/578,619

(22) PCT Filed: Jul. 30, 2012

(86) PCT No.: PCT/CN2012/079341
§ 371 (c)(1),
(2), (4) Date: Aug. 11, 2012

(87) PCT Pub. No.: WO2014/015529
PCT Pub. Date: Jan. 30, 2014

(65) Prior Publication Data
US 2014/0028946 A1   Jan. 30, 2014

(30) Foreign Application Priority Data

Jul. 24, 2012 (CN) .......................... 2012 1 0257624

(51) Int. Cl.
*G02F 1/1333* (2006.01)

(52) U.S. Cl.
USPC ............................................................ 349/58

(58) Field of Classification Search
USPC ............................................................ 349/58
See application file for complete search history.

(56) References Cited

U.S. PATENT DOCUMENTS

| | | | |
|---|---|---|---|
| 8,184,228 B2* | 5/2012 | Han et al. | 349/58 |
| 2005/0264714 A1* | 12/2005 | Hwang et al. | 349/58 |
| 2010/0073582 A1* | 3/2010 | Konno et al. | 348/794 |
| 2014/0139784 A1* | 5/2014 | Kawada | 349/58 |

* cited by examiner

*Primary Examiner* — Timothy L Rude
(74) *Attorney, Agent, or Firm* — Andrew C. Cheng

(57) ABSTRACT

The present invention provides a LCD device, and its backlight module and back plate assembly. The back plate assembly contains a back plate, a blocking rim, a side wall, and a buffering element. The back plate supports the optical member of the backlight module. The blocking rim fixes the optical member jointly with the back plate, and supports a liquid crystal panel. The side wall has a back edge connected with the back plate and a front edge connected with the blocking rim. The buffering element is configured at an edge of the blocking rim that is away from the side wall and attached to the optical member and a liquid crystal panel, respectively. The present invention prevents the optical member and liquid crystal panel from contacting with the blocking rim and thereby being scratched, so as to provide effective protection.

15 Claims, 3 Drawing Sheets

LCD DEVICE AND ITS BACKLIGHT MODULE AND BACK PLATE ASSEMBLY

BACKGROUND OF THE INVENTION

1. Field of the Invention

The present invention relates to the field of liquid crystal displaying techniques, and in particular to a liquid crystal display (LCD) device, and its backlight module and back plate assembly.

2. The Related Arts

The liquid crystal display techniques have significant advancement compared to prior technologies. For example, LCD devices are more power-saving, and of greater resolution. It is certain that more advanced techniques will be applied to the field of LCD.

However, to increase the overall quality of the LCD device and user experience, guaranteeing the quality of the optical member and liquid crystal panel is still the most basic requirement. It is well known that the optical member and liquid crystal panel are the more fragile components, and they can be easily scratched during the assembly, transportation, and usage processes. Especially, once they are scratched, the LCD device is hardly usable.

SUMMARY OF THE INVENTION

The technical issue to be addressed by the present invention is to provide a back plate assembly, and a backlight module and a LCD device equipped with the back plate assembly, so that the optical member and liquid crystal panel are protected from being scratched.

The resolve the technical issue, the present invention provides a back plate assembly for a backlight module, which contains a back plate, a blocking rim, a side wall, and a buffering element. The back plate supports the optical member of the backlight module. The blocking rim fixes the optical member jointly with the back plate, and supports a liquid crystal panel. The side wall has a back edge connected with the back plate and a front edge connected with the blocking rim. The buffering element contains a first buffering piece, a second buffering piece, and a linking piece. The first buffering piece is sandwiched between the blocking rim and the optical member so as to prevent the optical member from contacting with the blocking rim. The second buffering piece is sandwiched between the blocking rim and the liquid crystal panel so as to prevent the liquid crystal panel from contacting with the blocking rim. The linking piece joins the first and second buffering pieces. The first and second buffering pieces and the linking piece jointly form an accommodation trough receiving an edge of the blocking rim that is away from the side wall.

Preferably, the first and second buffering pieces, and the linking piece are integrally formed; and the accommodation trough is U-shaped.

Preferably, the first and second buffering pieces are made of one of silicone, rubber, and foam.

Preferably, first and second buffering pieces are attached to a back surface and a front surface of the edge of the blocking rim, respectively.

Preferably, a heat dissipation space is reserved in the accommodation trough adjacent to the side wall.

Alternatively, there are multiple back plates, blocking rims, and side wall, all joined together by the plural back plates.

Alternatively, the back plate assembly further contains at least a positioning element connecting the multiple back plates for supporting and fixing the optical member.

The resolve the technical issue, the present invention provides a backlight module which contains an optical member and a back plate assembly. The back plate assembly contains a back plate, a blocking rim, a side wall, and a buffering element. The back plate supports the optical member of the backlight module. The blocking rim fixes the optical member jointly with the back plate, and supports a liquid crystal panel. The side wall has a back edge connected with the back plate and a front edge connected with the blocking rim. The buffering element is configured at an edge of the blocking rim that is away from the side wall and attached to the optical member and a liquid crystal panel, respectively. The optical member contains stacked light guide plate and optical film. The light guide plate is attached to the back plate; and the optical film is attached to the buffering element.

The buffering element contains a first buffering piece, a second buffering piece, and a linking piece. The first buffering piece is sandwiched between the blocking rim and the optical member so as to prevent the optical member from contacting with the blocking rim. The second buffering piece is sandwiched between the blocking rim and the liquid crystal panel so as to prevent the liquid crystal panel from contacting with the blocking rim. The linking piece joins the first and second buffering pieces. The first and second buffering pieces and the linking piece jointly form an accommodation trough receiving an edge of the blocking rim that is away from the side wall.

Preferably, the first and second buffering pieces, and the linking piece are integrally formed; and the accommodation trough is U-shaped.

Preferably, the first and second buffering pieces are made of one of silicone, rubber, and foam.

Preferably, first and second buffering pieces are attached to a back surface and a front surface of the edge of the blocking rim, respectively.

The resolve the technical issue, the present invention provides a LCD device equipped with the aforementioned backlight module.

The buffering element of the LCD device contains a first buffering piece, a second buffering piece, and a linking piece. The first buffering piece is sandwiched between the blocking rim and the optical member so as to prevent the optical member from contacting with the blocking rim. The second buffering piece is sandwiched between the blocking rim and the liquid crystal panel so as to prevent the liquid crystal panel from contacting with the blocking rim. The linking piece joins the first and second buffering pieces. The first and second buffering pieces and the linking piece jointly form an accommodation trough receiving an edge of the blocking rim that is away from the side wall.

Preferably, the first and second buffering pieces, and the linking piece are integrally formed; and the accommodation trough is U-shaped.

Preferably, the first and second buffering pieces are made of one of silicone, rubber, and foam.

The present invention provides a back plate assembly having a buffering element, and a backlight module and a LCD device equipped with the back plate assembly. Through the buffering element of the back plate assembly, the optical member and the liquid crystal panel are protected from being scratched. In addition, the buffering element is structurally simple and conveniently manufactured so that the present invention can be assembled easily.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
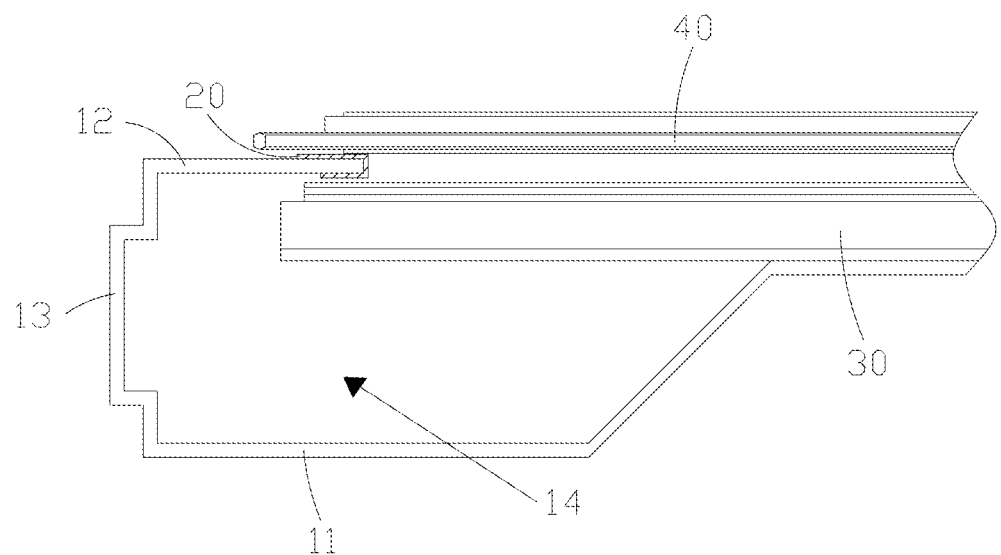
FIG. 1 is a schematic diagram showing a back plate assembly according to a first embodiment of the present invention on a LCD device.
Figure 2:
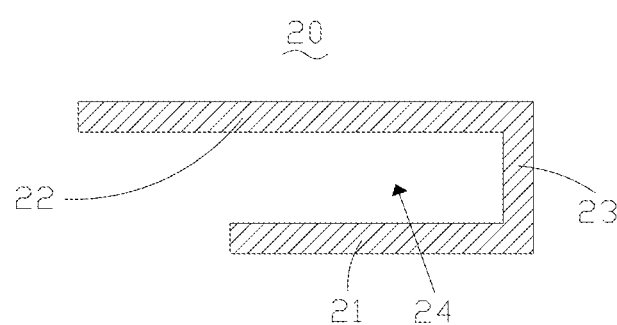
FIG. 2 is a schematic diagram showing the structure of a buffering element of the back plate assembly of FIG. 1.
Figure 3:
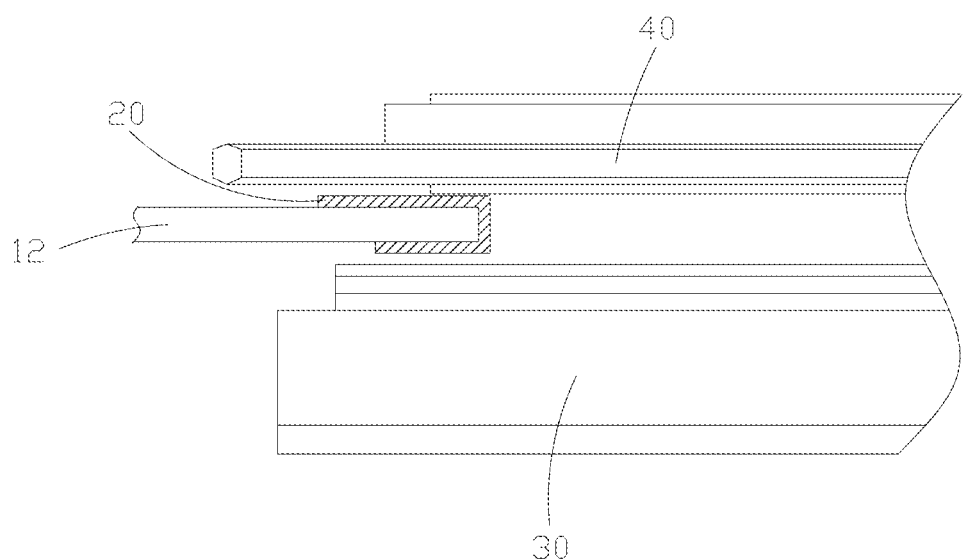
FIG. 3 is schematic diagram showing the interaction of the buffering element of FIG. 2 with the optical member and the liquid crystal panel of a LCD device.

As shown in FIGS. 1 to 3, according to a first embodiment of the present invention, a liquid crystal display (LCD) device contains, but is not limited to, a backlight module and a liquid crystal panel 40. The backlight module contains an optical member 30 and a correspondingly configured back plate assembly.

As illustrated in FIG. 1, the back plate assembly contains a back plate 11, a blocking rim 12, a side wall 13, and a buffering element 20. The back plate supports the optical member 30. A back edge of the side wall 13 (i.e., the edge adjacent to the back plate 11) is connected with the back plate 11. A front edge of the side wall 13 (i.e., the edge adjacent to the blocking rim 12) is connected with the blocking rim 12. The blocking rim 12 covers a portion of a front side of the optical member 30 and, jointly with the back plate 11) fixes the optical member 30. The blocking rim 12 also helps supporting the liquid crystal panel 40.

It also can be seen from FIG. 1 that the back plate 11, the blocking rim 12, and the side wall 13 jointly form a U-shaped trough which not only can accommodate and fix the optical member 30, but also can provide superior protection to the optical member 30.

In the present embodiment, a heat dissipation space 14 is reserved in the U-shaped trough adjacent to the side wall 13 so as to reduce the temperature inside the U-shaped trough. In addition, as the optical member 30's edge does not contact the side wall 13 and the back plate 11 directly, the heat dissipation space 14 also prevents the optical member 30's edge from being scratched. It should be noted that the heat dissipation space 14 is not a required technical feature of the present invention and in alternative embodiments its configuration is completely up to the practitioner. The present invention also does not impose specific limitation on the structure of the heat dissipation space 14 as long as a space is reserved for the convection of heat.

Regarding the structure of the side wall 13, it can be configured perpendicularly or slantwise to form an included angle not equal to 90 degrees with the back plate 11. In addition, the side wall 13 can be structured as a flat piece or with columns at intervals, as long as the back plate 11 and the blocking rim 12 can be joined. Furthermore, in order to work with the heat dissipation space 14, a number of small through holes can be configured on the side wall 13 so as to speed up the heat exchange with external atmosphere. In other words, the specific structure of the side wall 13 can be flexibly designed to fit product requirement and the present invention does not impose specific limitation.

It should be noted that the back plate 11, the blocking rim 12, and the side wall 13 can be integrally formed, or separately produced and subsequently connected together. The means of connection can be flexible too such as by bolts or rivets. The details should be familiar to those of the related arts and therefore are omitted here.

Similarly, the numbers of the back plate 11, the blocking rim 12, and the side wall 13 can be different depending on specific requirement. For example, there can be one back plate 11, one side wall 13, and one blocking rim 12 joined together; or there can be a number of back plates 11, a number of blocking rims 12, and a number of side walls 13 joined together by the back plates 11 or other parts. The present invention does not impose specific limitation.

To protect the optical member 30 and the liquid crystal panel 40 from being scratched, the back plate assembly of the present embodiment further contains a buffering element 20 configured at the edge of the blocking rim 12 that is away from the side wall 13. The buffering element 20 is in contact with the optical member 30 and the liquid crystal panel 40.

Specifically, the buffering element 20 contains a first buffering piece 21, a second buffering piece 22, and a linking piece 23. The first buffering piece 21 is sandwiched between the blocking rim 12 and the optical member 30 so as to prevent the optical member 30 from contacting with the blocking rim 12 directly and thereby being scratched. The second buffering piece 22 is sandwiched between the blocking rim 12 and the liquid crystal panel 40 so as to prevent the liquid crystal panel 40 from contacting with the blocking rim 12 directly and thereby being scratched. The linking piece 23 is for joining the first and second buffering pieces 21 and 22.

The first and second buffering pieces 21 and 22 and the linking piece 23 jointly form a U-shaped accommodation trough 24. It can be seen that the edge of the blocking rim 12 is embedded in the accommodation trough 24, or the accommodation trough 24 receives the edge of the blocking rim 12.

Generally, the first and second buffering pieces 21 and 22, and the linking piece 23 are integrally formed. In other words, the buffering element 20 is in one piece during the manufacturing process. It is also possible to manufacture the first and second buffering pieces 21 and 22 and the linking piece 23 separately and then connect them together to form the buffering element 20. The present invention does not impose specific limitation. The connection can be achieved by bolts, rivets, etc. The details should be familiar to those of the related arts and therefore are omitted here.

It is easy to understand that, in order to protect the optical member 30 and liquid crystal panel 40 from being scratched, the buffering element 20 is better made of a flexible material, especially for the first and second buffering pieces 21 and 22. In the present embodiment, the first and second buffering pieces 21 and 22 can be made of silicone, rubber, foam, etc. In alternative embodiments, other material that does not scratch the surface of the optical member 30 and the liquid crystal panel 40 can also be used. The present invention does not impose specific limitation.

Figure 4:
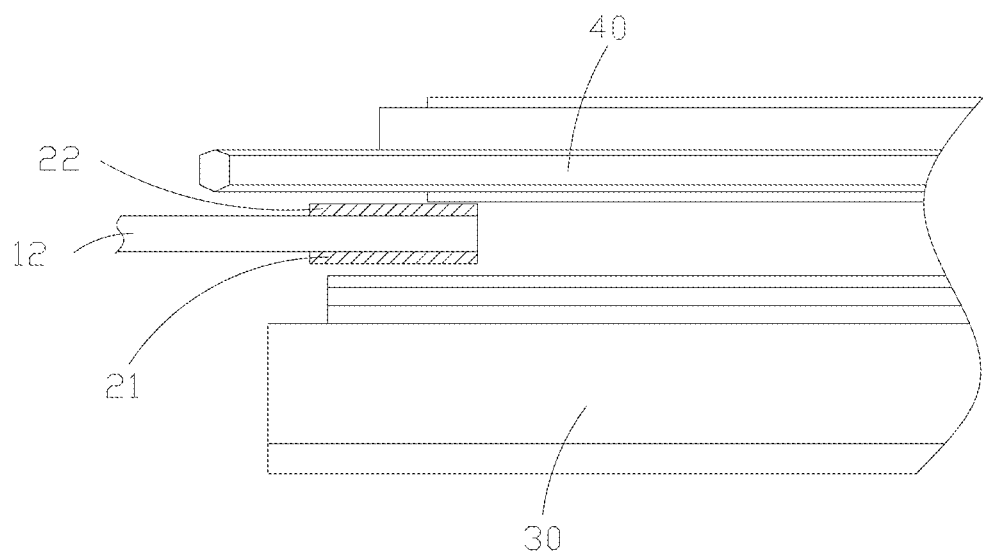
FIG. 4 is a schematic diagram showing a back plate assembly according to a second embodiment of the present invention on a LCD device.

As shown in FIG. 4, instead of configuring the buffering element 20 as an integrally formed U-shaped object, a second embodiment of the present invention has its buffering element 20 configured as two independent parts, namely, the first buffering piece 21 and the second buffering piece 22. The first buffering piece 21 is attached to a back surface of the edge of the blocking rim 12 whereas the second buffering piece 22 is attached to a front surface of the edge of the blocking rim 12. Even though without the linking piece 23 to join the first and second buffering pieces 21 and 22, the first and second buffering pieces 21 and 22 can still provide protection to the optical member 30 and the liquid crystal panel 40, yet with a reduced material cost by omitting the linking piece 23. The means of attachment can be flexibly chosen (e.g., direct adhesion). The details should be familiar to those of the related arts and therefore are omitted here.

Additionally, the structure and dimension of the buffering element 20 can be flexibly configured. For example, in the present embodiment, the cross-section of the first and second buffering pieces 21 and 22, and the linking piece 23 are rectangular and, in alternative embodiments, the cross-section of the first and second buffering pieces 21 and 22 can be a curved shape and the linking piece 23 can be a number of columns at intervals connecting the first and second buffering pieces 21 and 22. Generally, the first and second buffering pieces 21 and 22 can be configured to be of a larger dimension so as to increase the contact area with the optical member 30 and the liquid crystal panel 40 for even better protection.

Figure 5:
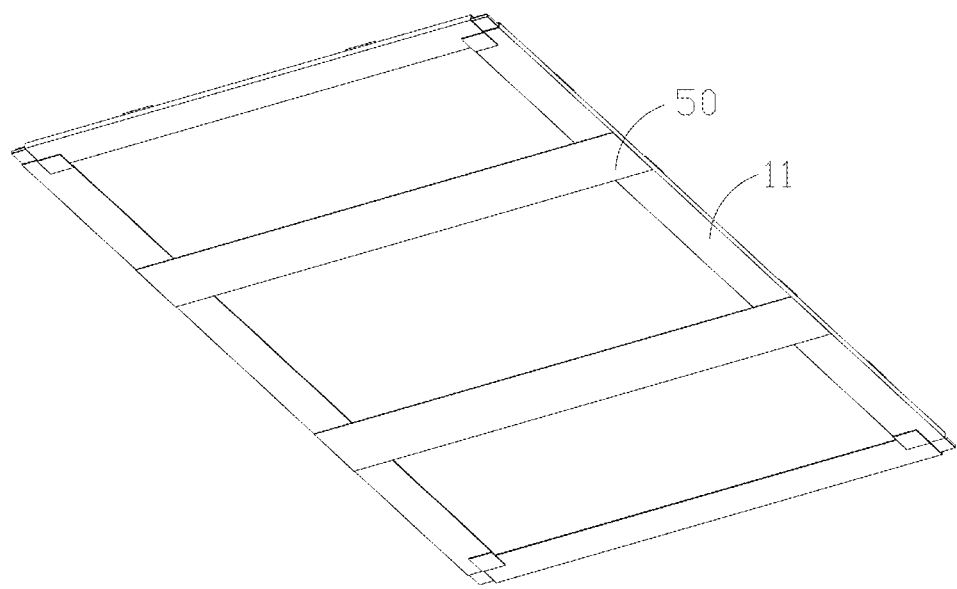
FIG. 5 is a schematic diagram showing a number of positioning. elements of a back plate assembly according to the present invention.

As shown in FIG. 5, the back plate assembly of the present embodiment further contains at least a positioning element 50 for supporting and fixing the optical member 30. It should be noted that the present invention does not specify features such as the number, shape, structure, and arrangement of the positioning elements 50. For example, there can be 2, 3, 4, or 1 positioning element 50, all capable of supporting and fixing the optical member 30. In addition, the positioning element 50 can be an elongated slim piece (as shown in FIG. 5), a column, a circular piece, or of any other shape. The positioning pieces 50 can be arranged as a cross, an intersecting parallel, or a mesh. The present invention does not impose specific limitation.

To use the back plate assembly on a LCD device, the buffering element 20 is first put on the blocking rim 12 and, then, the optical member 30 and the liquid crystal panel 40 is assembled. The details of the assembly should be familiar to those of the related arts and therefore are omitted here.

The back plate assembly, especially the buffering element 20, effectively prevents the optical member 30 and the liquid crystal panel 40 from being scratched, and as such provides enhanced protection. Considering that the optical member 30 and the liquid crystal panel 40 are the key components of a LCD device, the buffering element 20 of the back plate assembly can extend the operational life span of the LCD device and guarantee its usage reliability, in addition to the protection provided to the optical member 30 and the liquid crystal panel 40.

In a third embodiment of the present invention, a backlight module is provided, which contains optical member and the aforementioned back plate assembly. The optical member contains stacked light guide plate and optical film. The light guide plate is attached to the back plate and the optical film is attached to the buffering pieces. Since the back plate assembly has already been described above, the details are omitted here.

In a fourth embodiment of the present invention, a LCD device is provided, which contains a liquid crystal panel and the aforementioned backlight module. Since the details have already been described, they are omitted here.

It should be easy to understand that, regardless of the backlight module or the LCD device, due to the back plate assembly, the optical member and the liquid crystal panel are protected from being scratched. As such, the quality of the LCD device is guaranteed and its operational life span is extended.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A back plate assembly for a backlight module, comprising:
    a back plate supporting an optical member of the backlight module;
    a blocking rim fixing the optical member jointly with the back plate, and supporting a liquid crystal panel;
    a side wall having a back edge connected with the back plate and a front edge connected with the blocking rim; and
    a buffering element, comprising
    a first buffering piece sandwiched between the blocking rim and the optical member so as to prevent the optical member from contacting with the blocking rim;
    a second buffering piece sandwiched between the blocking rim and the liquid crystal panel so as to prevent the liquid crystal panel from contacting with the blocking rim; and
    a linking piece joining the first and second buffering pieces;
    wherein
    the blocking rim, the side wall, and the back plate jointly form a heat dissipation space around an edge of the optical member so that the edge of the optical member does not contact with the side wall and the back plate;
    a plurality of small through holes are configured on the side wall so as to speed up the heat exchange between external atmosphere and the heat dissipation space; and the first and second buffering pieces, and the linking piece jointly form an accommodation trough receiving an edge of the blocking rim that is away from the side wall.

2. The back plate assembly as claimed in claim 1, wherein the first and second buffering pieces and the linking piece are integrally formed; and the accommodation trough is U-shaped.

3. The back plate assembly as claimed in claim 1, wherein the first and second buffering pieces are made of one of silicone, rubber, and foam.

4. The back plate assembly as claimed in claim 1, wherein the first and second buffering pieces are attached to a back surface and a front surface of the edge of the blocking rim, respectively.

5. The back plate assembly as claimed in claim 1, wherein there are a plurality of back plates, blocking rims, and side wall, all joined together by the plural back plates.

6. The back plate assembly as claimed in claim 5, further comprising at least a positioning element connecting the plurality of back plates for supporting and fixing the optical member.

7. A backlight module comprising an optical member and a back plate assembly, the back plate assembly comprising:
   a back plate supporting an optical member of the backlight module;
   a blocking rim fixing the optical member jointly with the back plate, and supporting a liquid crystal panel;
   a side wall having a back edge connected with the back plate and a front edge connected with the blocking rim; and
   a buffering element configured at an edge of the blocking rim that is away from the side wall and attached to the optical member and a liquid crystal panel, respectively;
   wherein
   the blocking rim, the side wall, and the back plate jointly form a heat dissipation space around an edge of the optical member so that the edge of the optical member does not contact with the side wall and the back plate and so that the temperature inside the heat dissipation space is reduced;
   a plurality of small through holes are configured on the side wall so as to speed up the heat exchange between external atmosphere and the heat dissipation space; and the optical member comprises stacked light guide plate and optical film; the light guide plate is attached to the back plate; and the optical film is attached to the buffering element.

8. The backlight module as claimed in claim 7, wherein buffering element comprises:
   a first buffering piece sandwiched between the blocking rim and the optical member so as to prevent the optical member from contacting with the blocking rim;
   a second buffering piece sandwiched between the blocking rim and the liquid crystal panel so as to prevent the liquid crystal panel from contacting with the blocking rim; and
   a linking piece joining the first and second buffering pieces;
   wherein the first and second buffering pieces, and the linking piece jointly form an accommodation trough receiving an edge of the blocking rim that is away from the side wall.

9. The backlight module as claimed in claim 8, wherein the first and second buffering pieces, and the linking piece are integrally formed; and the accommodation trough is U-shaped.

10. The backlight module as claimed in claim 8, wherein the first and second buffering pieces are made of one of silicone, rubber, and foam.

11. The backlight module as claimed in claim 8, wherein the first and second buffering pieces are attached to a back surface and a front surface of the edge of the blocking rim, respectively.

12. A LCD device comprising the backlight module as claimed in claim 7.

13. The LCD device as claimed in claim 12, wherein the buffering element comprises:
   a first buffering piece sandwiched between the blocking rim and the optical member so as to prevent the optical member from contacting with the blocking rim;
   a second buffering piece sandwiched between the blocking rim and the liquid crystal panel so as to prevent the liquid crystal panel from contacting with the blocking rim; and
   a linking piece joining the first and second buffering pieces;
   wherein the first and second buffering pieces, and the linking piece jointly form an accommodation trough receiving an edge of the blocking rim that is away from the side wall.

14. The LCD device as claimed in claim 13, wherein the first and second buffering pieces, and the linking piece are integrally formed; and the accommodation trough is U-shaped.

15. The LCD device as claimed in claim 13, wherein the first and second buffering pieces are made of one of silicone, rubber, and foam.

* * * * *